US012111043B2

(12) United States Patent
Bainter et al.

(10) Patent No.: US 12,111,043 B2
(45) Date of Patent: Oct. 8, 2024

(54) LIGHTING DEVICE WITH MULTIPLE LIGHT SOURCES

(71) Applicants: Benjamin Edward Bainter, Fort Worth, TX (US); Raymond Adam Nemeyer, Beaverton, OR (US); Alejandro Chavez, Overland Park, KS (US)

(72) Inventors: Benjamin Edward Bainter, Fort Worth, TX (US); Raymond Adam Nemeyer, Beaverton, OR (US); Alejandro Chavez, Overland Park, KS (US)

( * ) Notice: Subject to any disclaimer, the term of this patent is extended or adjusted under 35 U.S.C. 154(b) by 0 days.

(21) Appl. No.: 18/420,564

(22) Filed: Jan. 23, 2024

(65) Prior Publication Data

US 2024/0247796 A1 Jul. 25, 2024

Related U.S. Application Data

(60) Provisional application No. 63/481,004, filed on Jan. 23, 2023.

(51) Int. Cl.

*F21V 23/00* (2015.01)
*F21V 5/00* (2018.01)
*F21V 17/02* (2006.01)
*F21V 21/088* (2006.01)
*F21V 23/04* (2006.01)
*F21Y 113/00* (2016.01)

(52) U.S. Cl.

CPC .......... *F21V 23/0414* (2013.01); *F21V 5/006* (2013.01); *F21V 5/008* (2013.01); *F21V 17/02* (2013.01); *F21V 21/0885* (2013.01); *F21Y 2113/00* (2013.01)

(58) Field of Classification Search

CPC ...... F21V 23/0414; F21V 5/006; F21V 5/008; F21V 17/02; F21V 21/0885

See application file for complete search history.

(56) References Cited

U.S. PATENT DOCUMENTS 8,147,089 B2 * 4/2012 Matthews ............ F21V 14/065 362/198
8,182,109 B2 * 5/2012 Matthews ............ F41G 11/003 362/198

(Continued)

*Primary Examiner* — Gerald J Sufleta, II

(57) ABSTRACT

A lighting device with multiple light sources includes a housing, a first illuminating source, a second illuminating source, a lens assembly, a light reflecting and transmitting filter, a first power switch, a second power switch, and a power source. The first illuminating source and the second illuminating source are mounted within the housing and perpendicularly positioned of each other. The lens assembly is operatively coupled to the housing, wherein the lens assembly focus the first illuminating source and the second illuminating source between a spot position and a collimating potion. The light reflecting and transmitting filter is angularly mounted in between the first illuminating source and the second illuminating source, The first power switch and the second power switch are mounted onto the housing. The power source being electrically connected to the first illuminating source through the first power switch and the second illuminating source through the second power switch.

13 Claims, 17 Drawing Sheets

(56) References Cited

U.S. PATENT DOCUMENTS

| | | | | |
|---|---|---|---|---|
| 8,226,267 | B2 * | 7/2012 | Sharrah | F21V 33/00 362/249.05 |
| 11,614,308 | B2 * | 3/2023 | DeBobes | F41C 27/00 42/146 |
| 2005/0237735 | A1 * | 10/2005 | Fan | B60Q 1/2611 362/191 |
| 2012/0140468 | A1 * | 6/2012 | Chang | F21V 7/0016 362/249.03 |
| 2018/0283670 | A1 * | 10/2018 | Galli | F41G 11/003 |
| 2023/0109948 | A1 * | 4/2023 | Mayberry | F41G 11/003 42/124 |
| 2023/0346503 | A1 * | 11/2023 | Frey | A61B 90/30 |

* cited by examiner

LIGHTING DEVICE WITH MULTIPLE LIGHT SOURCES

FIELD OF THE INVENTION

The present invention relates generally to lighting devices. More specifically, the present invention is a lighting apparatus that is capable of projecting two different light spectrums through a pair of power switches and a power source.

BACKGROUND OF THE INVENTION

A lighting device with multiple light sources includes weapon-mounted devices, vehicle-mounted devices, UAV and SUAV mounted devices, helmet mounted devices, and other related light devices. These existing light devices are generally powered with an external power source and utilized for communication and surveillance purposes. These existing lighting devices provide a combination of two or more light sources, including, but not limited to visible light, Infrared (IR), Short Wavelength Infrared (SWIR), Medium Wavelength Infrared (MWIR), Long Wavelength Infrared (LWIR), Ultraviolet (UV), and/or near-IR. However, changing from one light source to another light source generally requires the user to change the lens of the lighting device or the light source of the lighting device. As a result, switching from one light source to another has become time consuming process and cumbersome process due to the additional lenses or the light sources.

It is therefore an objective of the present invention to provide a lighting device with multiple light sources wherein each light source is individually controlled via a designated switch. Furthermore, a light reflecting and transmitting filter of the present invention allows the multiple light sources to reflect or transmission so that the multiple light sources can exit through the lens assembly of the present invention. Resultantly, the present invention allows the user to easily switch between multiple light sources without changing any of the functional components.

DETAIL DESCRIPTIONS OF THE INVENTION

All illustrations of the drawings are for the purpose of describing selected versions of the present invention and are not intended to limit the scope of the present invention.

Figure 1:
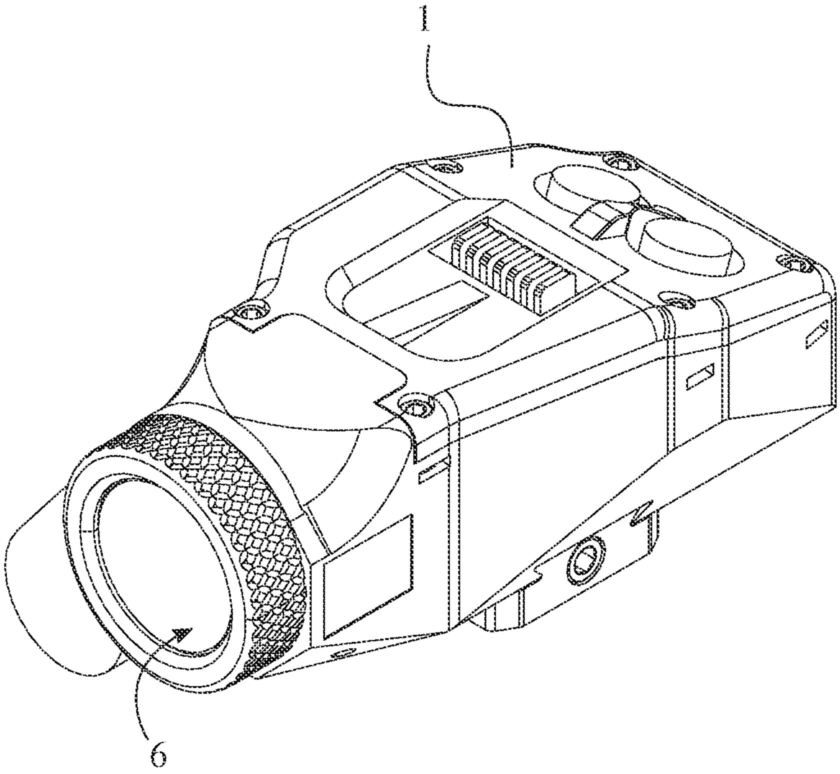
FIG. 1 is a front perspective view of the present invention.
Figure 2:
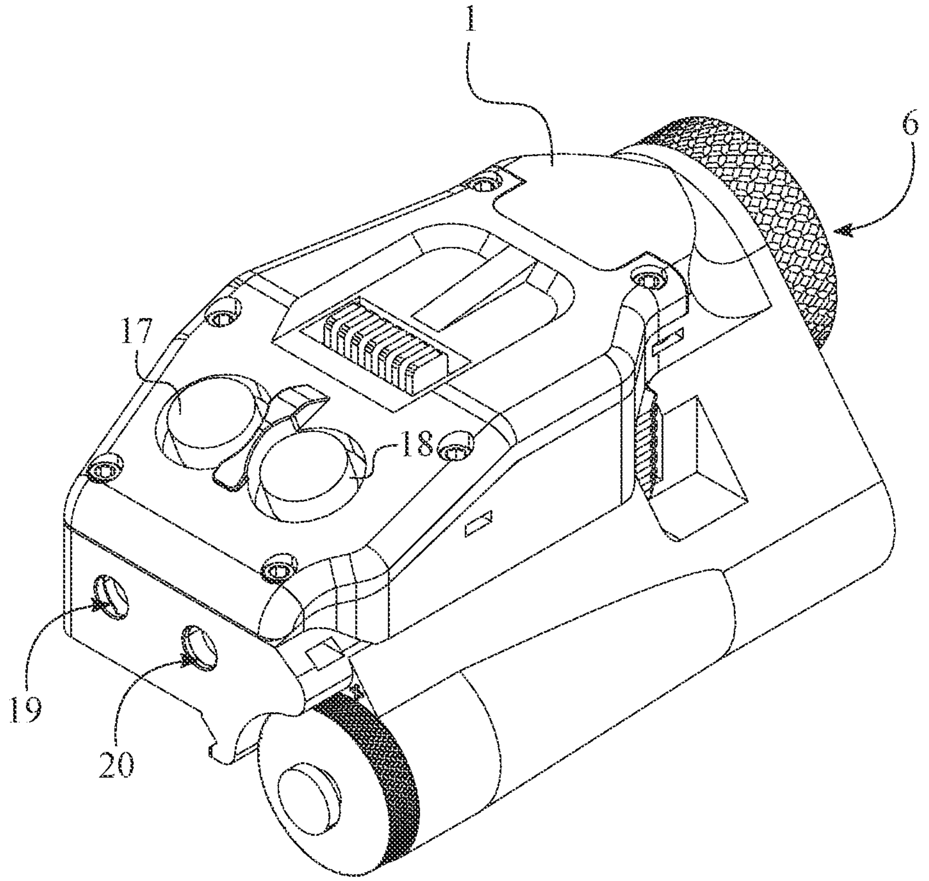
FIG. 2 is a rear perspective view of the present invention.
Figure 3:
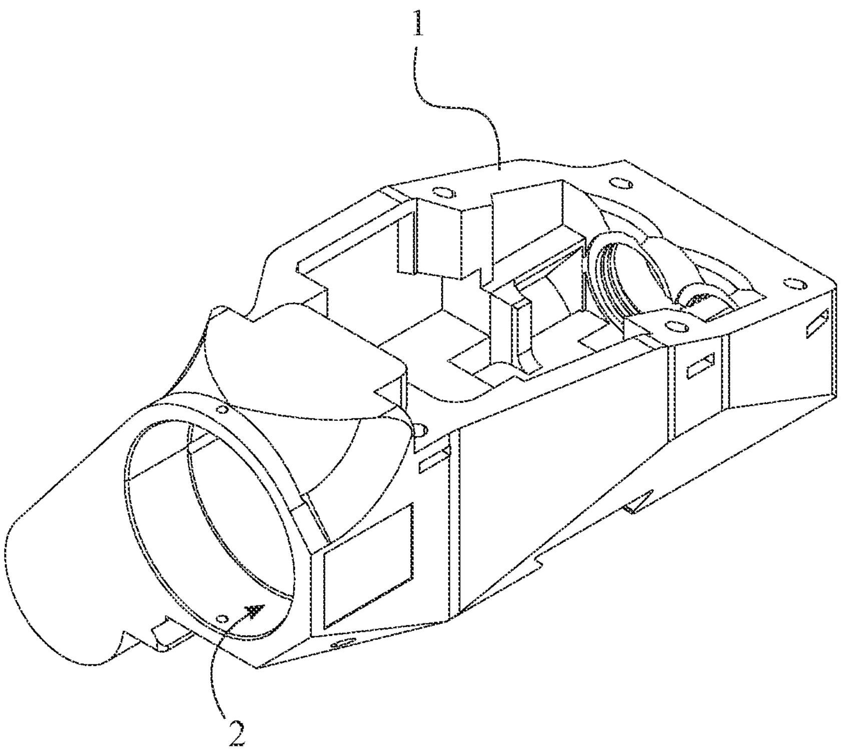
FIG. 3 is a front perspective view of the housing of the present invention, showing the primary chamber.
Figure 4:
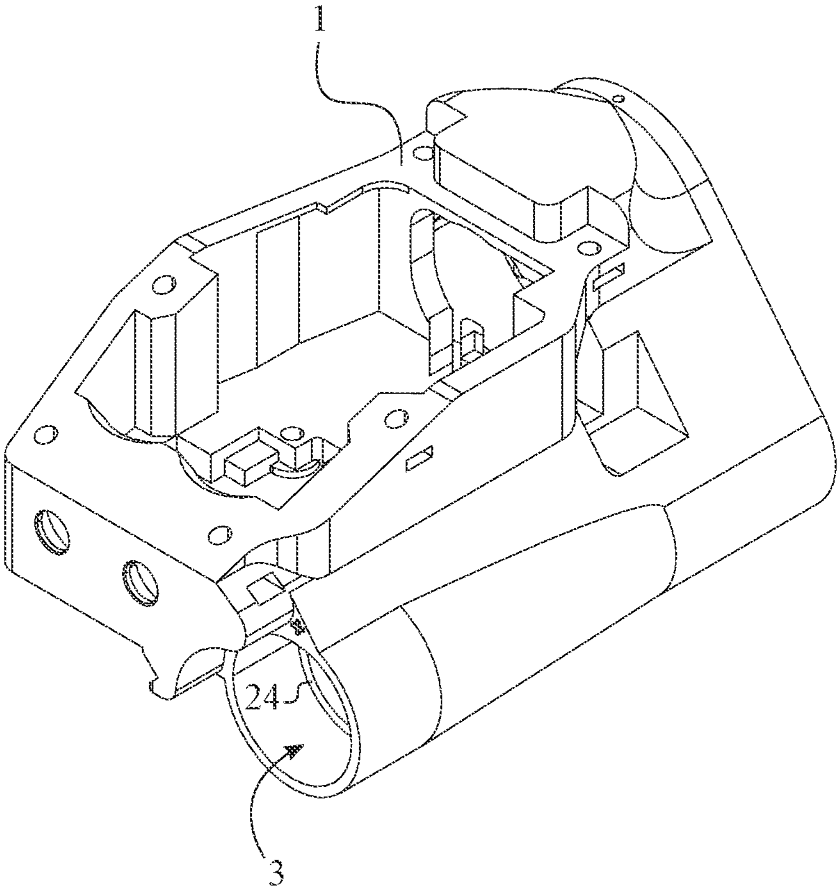
FIG. 4 is a rear perspective view of the housing of the present invention, showing the secondary chamber.
Figure 5:
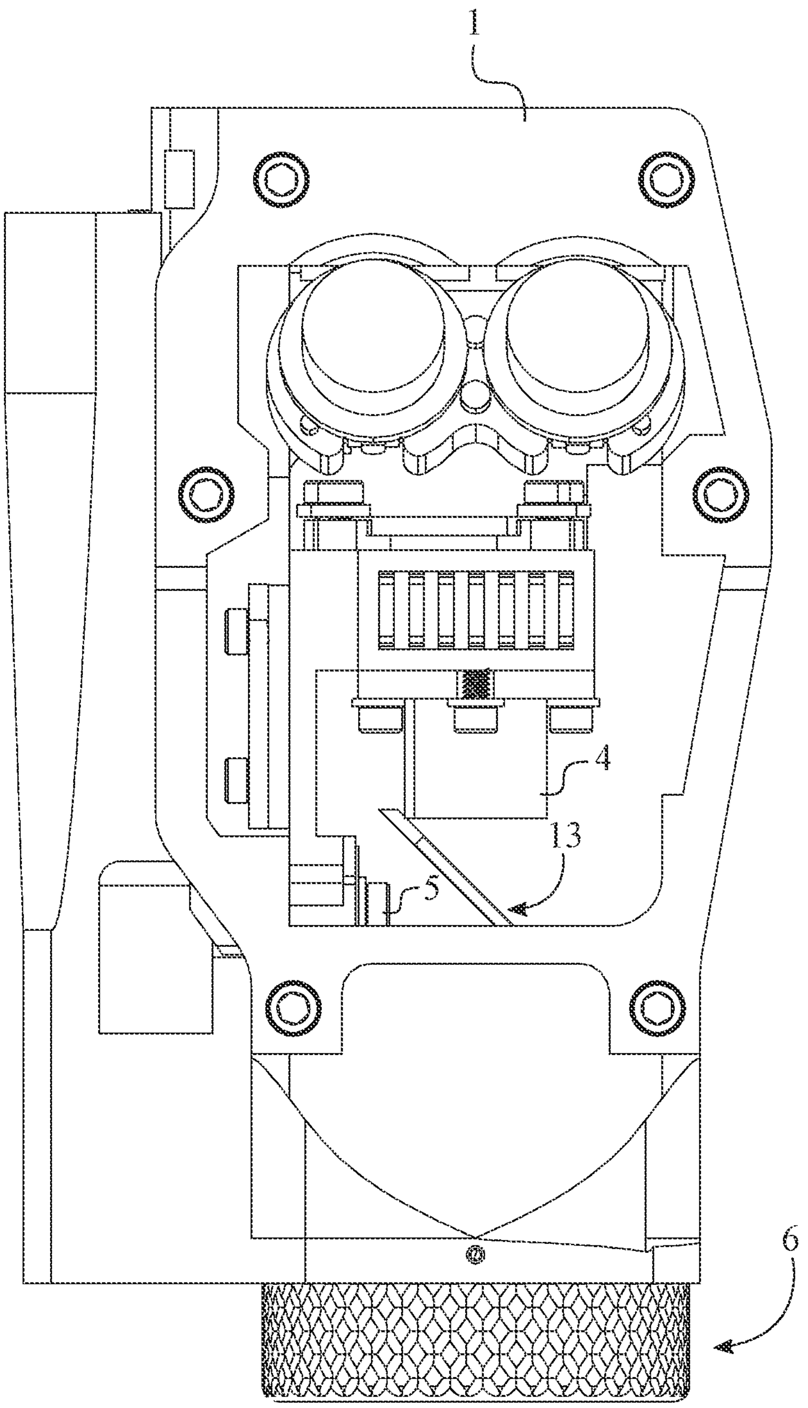
FIG. 5 is a top view of the present invention showing the internally mounted first illuminating source, the second illuminating source, and the light reflecting and transmitting filter.
Figure 6:
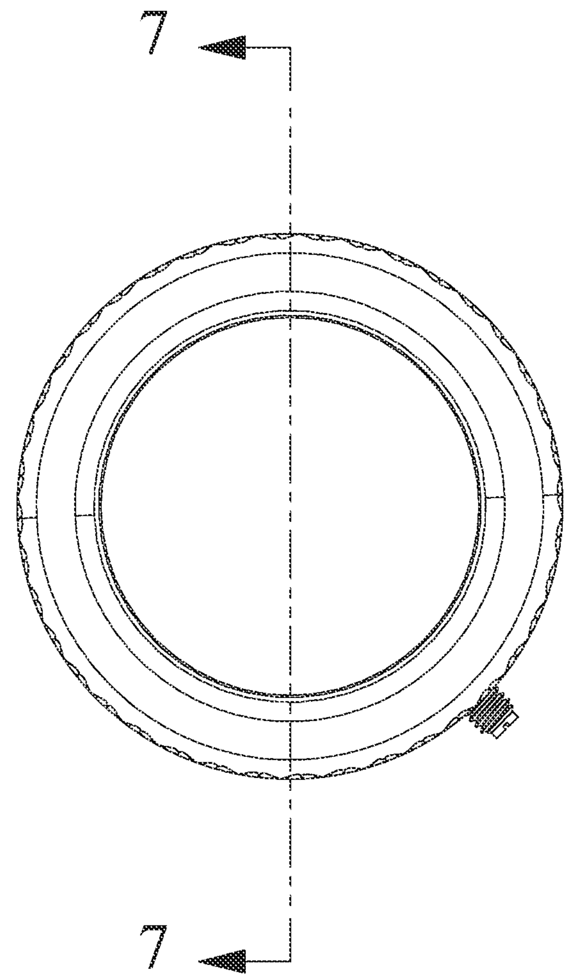
FIG. 6 is a front view of the lens assembly, showing the plane upon which a cross sectional view is taken shown in FIG. 8.

The present invention is a lighting device with multiple light sources wherein each light source is individually controlled via a designated switch. Due to the designated switch, multiple light source can be easily powered and controlled within the present invention without having to interchange any of the functional components. The multiple light sources emitted from the present invention can include but not limited to, visible light, Infrared (IR), Short Wavelength Infrared (SWIR), Medium Wavelength Infrared (MWIR), Long Wavelength Infrared (LWIR), Ultraviolet (UV), and/or near-IR. As shown in FIGS. 1-2 and FIG. 5, the present invention comprises a housing 1, a first illuminating source 4, a second illuminating source 5, a lens assembly 6, a light reflecting and transmitting filter 13, a first power switch 17, a second power switch 18, and a power source 21.

In reference to the general configuration of the present invention, as shown in FIG. 1-10, the housing 1 functions as a protective cover so that some of the components of the present invention can be mounted within. The first illuminating source 4 functions as the first light source and is mounted within the housing 1. The second illuminating source 5 functions as the second light source and mounted within the housing 1. The first illuminating source 4 and the second illuminating source 5 are perpendicularly positioned of each other thus allowing the light reflecting and transmitting filter 13 to be angularly mounted in between the first illuminating source 4 and the second illuminating source 5. In other words, when the first illuminating source 4 is activated, a plurality of first incident rays of the first illuminating source 4 is able to transmit through the light reflecting and transmitting filter 13 and exits the lens assembly 6 as a plurality of transmitted rays. When the second illuminating source 5 is activated, a plurality of second incident rays of the second illuminating source 5 is able to reflect about the light reflecting and transmitting filter 13 and exits the lens assembly 6 as a plurality of reflected rays. The lens assembly 6 is operatively coupled to the housing 1, wherein the lens assembly 6 focuses the first illuminating source 4 and the second illuminating source 5 between a spot position and a collimating position. For example, when the present invention is operational, the lens assembly 6 can focus either the plurality of transmitted rays or the plurality of reflected rays as both the plurality of transmitted rays and the plurality of reflected rays shares the same optical path. The first power switch 17 and the second power switch 18 are mounted onto the housing 1 so that the user can easily access the corresponding power switch. In order to activate and operate the first illuminating source 4, the power source 21 is electrically connected to the first illuminating source 4 through the first power switch 17. In order to activate and operate the second illuminating source 5, the power source 21 is electrically connected to the second illuminating source 5 through the second power switch 18.

The housing 1 is an enclosed body to protect the internally mounted components from outside elements. The housing 1 can be manufactured has a singular body or a plurality of modular bodies without deviating from the scope of the functionality. In reference to FIG. 3-4, the housing 1 comprises a primary chamber 2 and a secondary chamber 3. More specifically, the primary chamber 2 is configured to position the lens assembly 6 so that the plurality of transmitted rays and the plurality of reflected rays can be emitted from the housing 1. The secondary chamber 3 is configured to receive the power source 21 so that the first illuminating source 4 and the second illuminating source 5 can be electrically powered. The housing 1 also functions as the foundational component of the present invention as the rest of the components are mounted, attached, connected, or engaged in relation to the housing 1.

In reference to FIG. 5, the first illuminating source 4 and the second illuminating source 5 are positioned within the primary chamber 2 of the housing 1. The first illuminating source 4 is concentrically positioned to the lens assembly 6 so that the plurality of first incident rays can be emitted towards the light reflecting and transmitting filter 13. The second illuminating source 5 is laterally positioned to the lens assembly 6 so that the plurality of second incident rays can be emitted towards the light reflecting and transmitting filter 13. Due to the 90 degree positioning of the first illuminating source 4 and the second illuminating source 5, the first illuminating source 4 can be activated and emitted without having to change the positioning of the second illuminating source 5 or the lens assembly 6. Similarly, the second illuminating source 5 can be activated and emitted without having to change the positioning of the first illuminating source 4 or the lens assembly 6. The first illuminating source 4 and the second illuminating source 5 can be a combination of including but not limited to the following methods/technology of producing light; Light Emitting Diode (LED), Laser Excited Phosphor (LEP), Light Emitting Plasma (LEP), fluorescent, incandescent, high-intensity discharge (HID), Field-induced polymer electroluminescence (FIPEL), Vertical-Cavity Surface-Emitting Laser (VCSEL), and/or lasers.

The lens assembly 6 is able to focus the plurality of transmitted rays and the plurality of reflected rays between the spot position and the collimating position so that the corresponding rays can be emitted from the present invention. As shown in FIG. 6-9, the lens assembly 6 comprises a lens carriage 7, an annular ring 10, a focusing lens 11, and a protective lens 12. More specifically, the lens carriage 7 is concentrically positioned within the primary chamber 2 of the housing 1 and rotatably mounted to the housing 1. The annular ring 10, the focusing lens 11, and the protective lens 12 are axially positioned within the lens carriage 7 so that the lens assembly 6 can be operational. The annular ring 10 is rotatably engaged within the lens carriage 7 thus allowing the focusing lens 11 to be radially connected within the annular ring 10. As a result, when the lens carriage 7 is rotated around a central axis of the primary chamber 2, the annular ring 10 and the focusing ring 9 are able to move back and forth within the lens carriage 7 to attain the spot position and the collimating position. The protective lens 12 is radially connected to the lens carriage 7 so that the focusing lens 11 can be protected from outside elements. In other words, the focusing lens 11 is positioned adjacent to the light reflecting and transmitting filter 13 so that the plurality of transmitted rays and the plurality of reflected rays can be focused between the spot position and the collimating position as the protective lens 12 is positioned offset from the focusing lens 11 and opposite of the light reflecting and transmitting filter 13.

Figure 7:
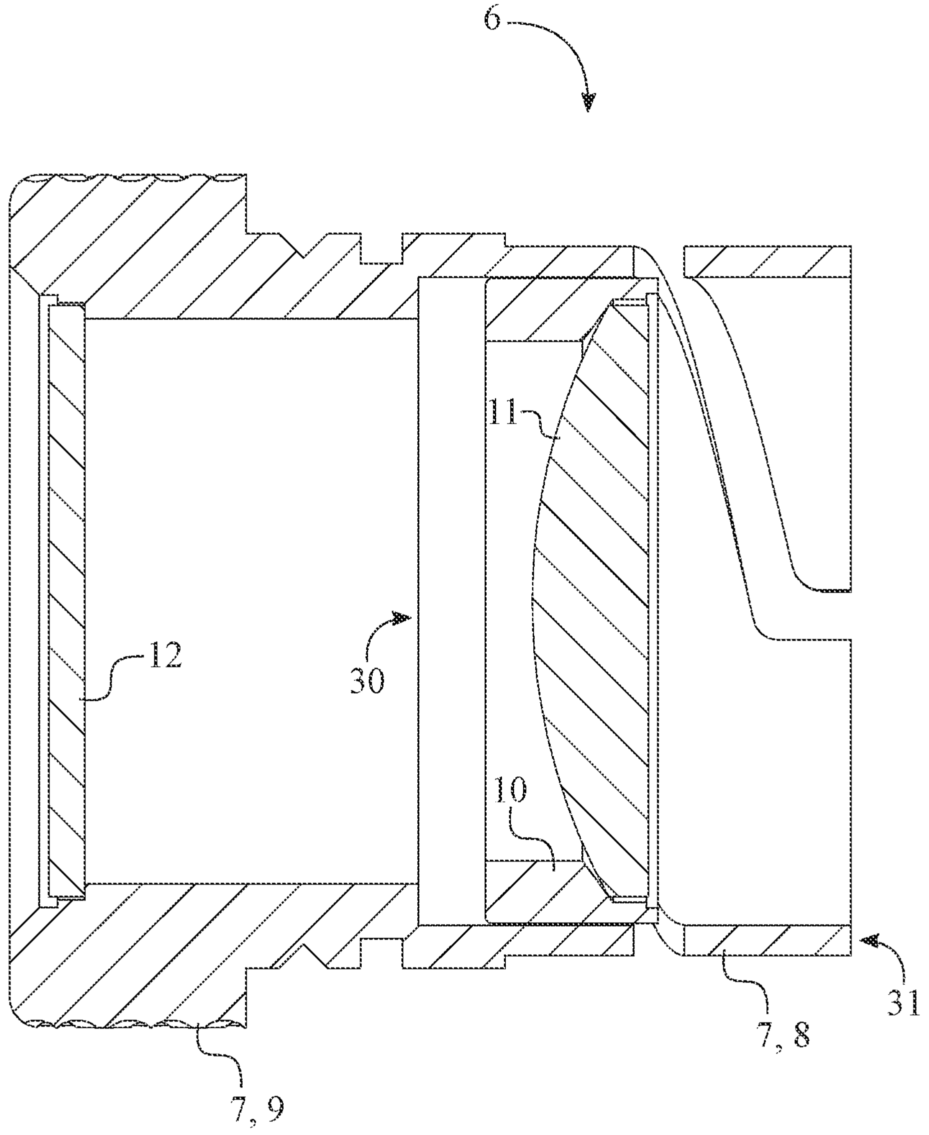
FIG. 7 is a cross section of the lens assembly taken along line 7-7 of FIG. 6, wherein the lens assembly is at the spot position.
Figure 8:
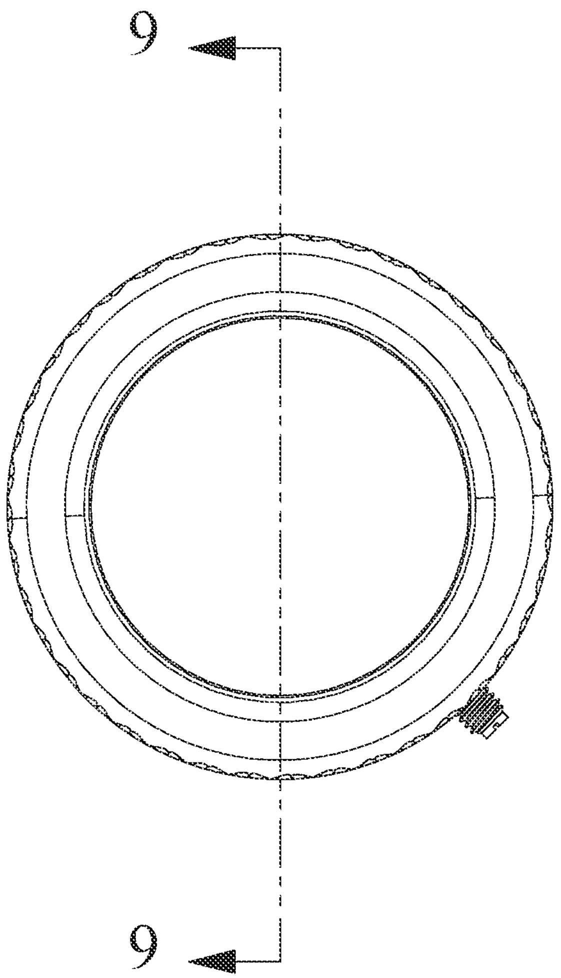
FIG. 8 is a front view of the lens assembly, showing the plane upon which a cross sectional view is taken shown in FIG. 9.
Figure 9:
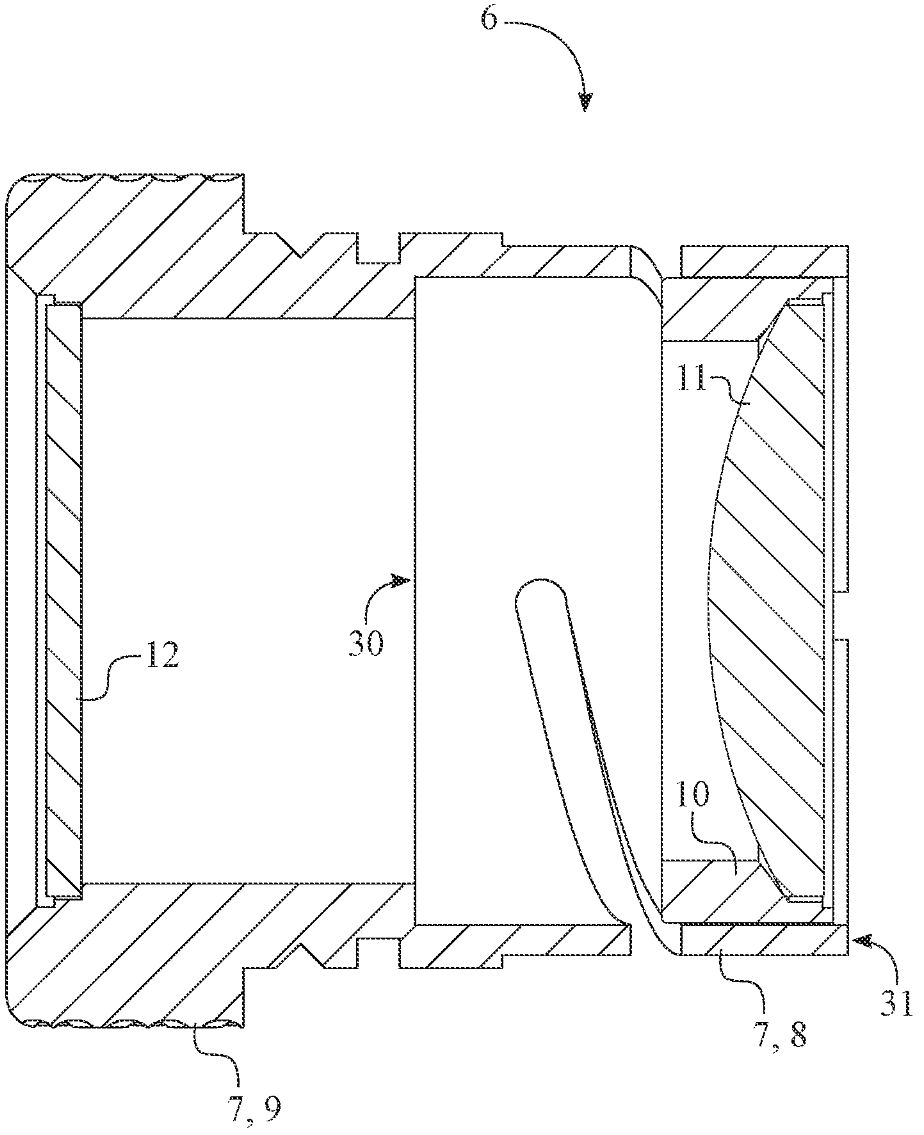
FIG. 9 is a cross section of the lens assembly taken along line 9-9 of FIG. 8, wherein the lens assembly is at the collimating position.

In reference to FIG. 7 and FIG. 9, the lens carriage 7 comprises a helical cam barrel 8 and a focusing ring 9 so that the lens carriage 7 is able to stationary rotate around the central axis of the primary chamber 2 while allowing the focusing lens 11 to be axially move back and forth along the central axis. More specifically, the helical cam barrel 8 is concentrically positioned to the focusing ring 9 and adjacently connected to the focusing ring 9. The annular ring 10 is rotatably engaged to the helical cam barrel 8 so that the annular ring 10 is able to move back and forth as the lens carriage 7 is rotated around the central axis. In other words, the annular ring 10 is engaged with a helical channel of the helical cam barrel 8 thus allowing the axial rotation of the lens carriage 7 to move the annular ring 10 back and forth along the helical channel. The protective lens 12 is radially connected within the focusing ring 9 and positioned offset of the annular ring 10. As shown in FIG. 7, when the lens assembly 6 is configured to the spot position, the annular ring 10 is positioned adjacent to a distal end 30 of the helical cam barrel 8 and adjacent to the focusing ring 9. As shown in FIG. 9, when the lens assembly 6 is configured to the collimating position, the annular ring 10 is positioned adjacent to a proximal end 31 of the helical cam barrel 8 and adjacent to the light reflecting and transmitting filter 13.

In reference to FIG. 1, the light reflecting and transmitting filter 13 comprises a glass body 14, a reflective surface 15, and a transmission surface 16. More specifically, the glass body 14 is mounted within the primary chamber 2 of the housing 1. The reflective surface 15 is oppositely positioned of the transmission surface 16 about the glass body 14 so that the reflective surface 15 and the transmission surface 16 are able to direct the plurality of transmitted rays and the plurality of reflected rays into the focusing lens 11. The reflective surface 15 and the transmission surface 16 of the light reflecting and transmitting filter 13 are attained by superimposing at least one optical coating onto the glass body 14. Furthermore, the wavelength range to be transmitted or reflected can be attained by correctly calculating the thickness of the optical coating and the number of layers of the optical coating. For example, when the first illuminating source 4 is activated, the plurality of first incident rays is transmitted into the lens assembly 6 through the transmission surface 16 and the glass body 14 as the plurality of transmitted rays. When the second illuminating source 5 is activated, the plurality of second incident rays is transmitted into the lens assembly 6 through the reflective surface 15 as the plurality of transmitted rays. The present invention preferably utilizes a dichroic mirror as the light reflecting and transmitting filter 13. However, the present invention can utilize any other types of mirrors, lenses, or glass substrates that enable light transmission about an arbitrary mirror surface and light reflection about an opposing mirror surface of the arbitrary mirror surface.

Figure 10:
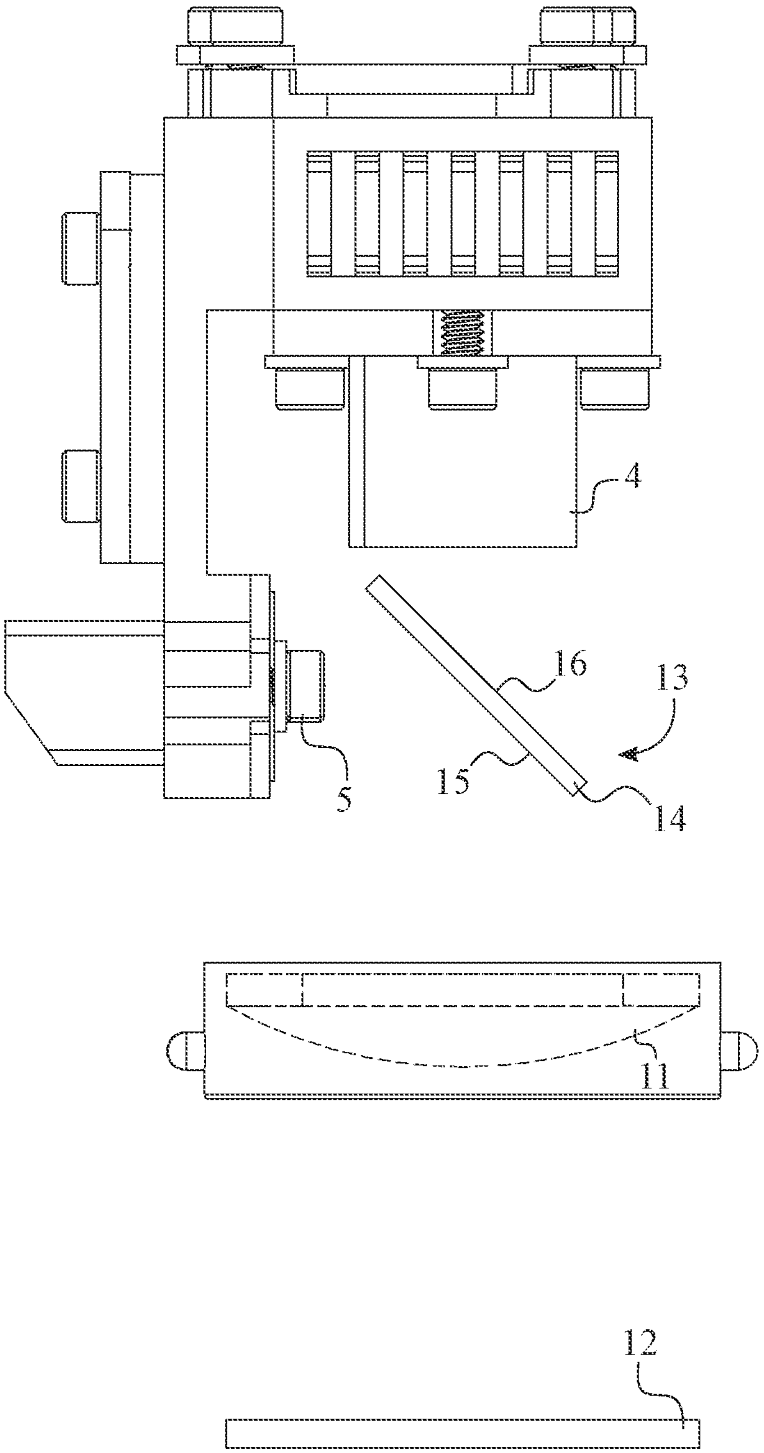
FIG. 10 is a top view of the present invention showing the lens assembly, the first illuminating source, the second illuminating source, and the light reflecting and transmitting filter.
Figure 11:
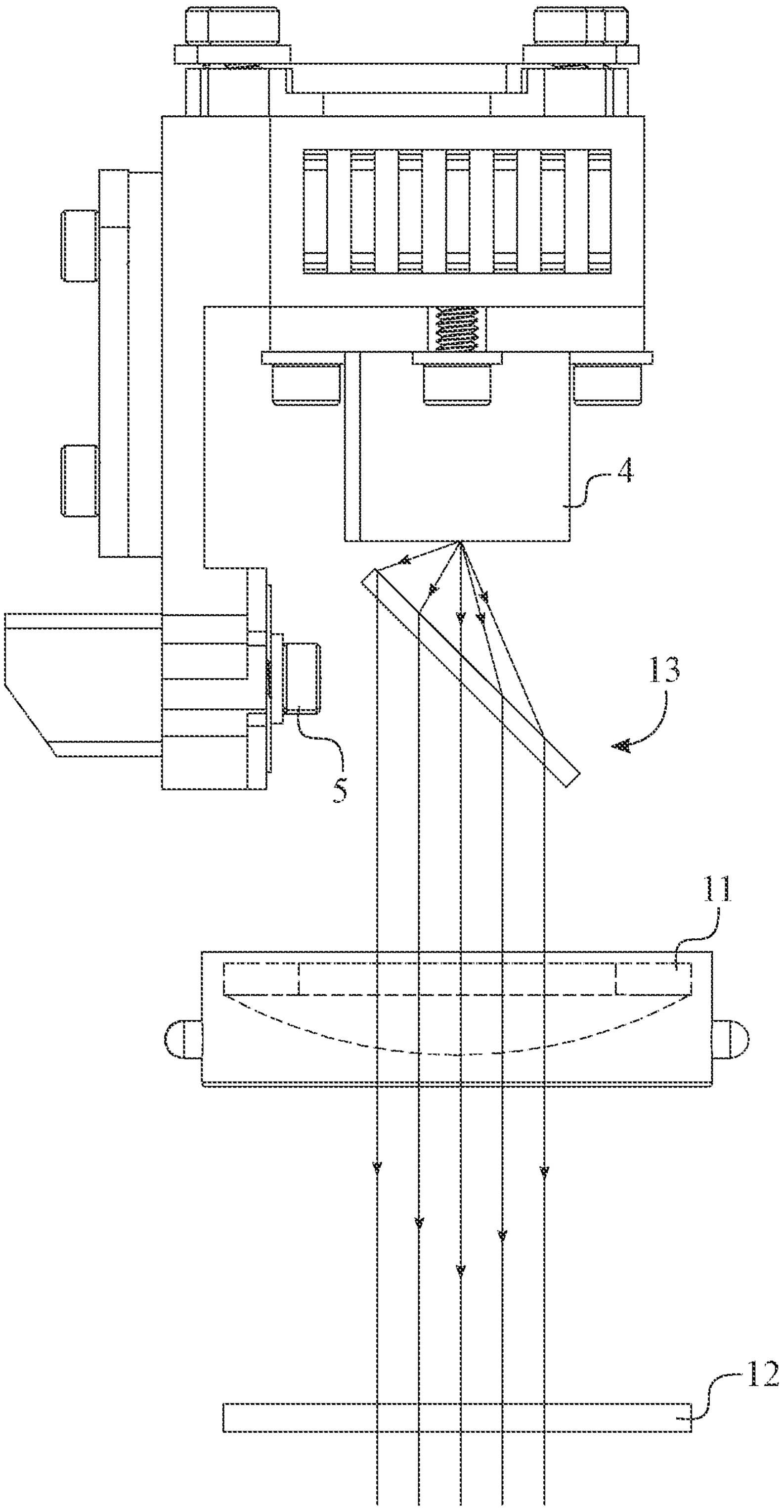
FIG. 11 is a top view of the present invention showing the activation of the first illuminating source and the plurality of transmitted rays.

As shown in FIG. 10-11, the first illuminating source 4 is internally mounted to the housing 1 and concentrically positioned to the focusing lens 11. The light reflecting and transmitting filter 13 is angularly positioned to the first illuminating source 4 at a 45 degree angle, wherein the transmission surface 16 of the light reflecting and transmitting filter 13 is angularly oriented toward the first illuminating source 4. As a result, when the first illuminating source 4 emits the plurality of first incident rays towards the transmission surface 16, the plurality of first incident rays transmits through the glass body 14 of the light reflecting and transmitting filter 13 exits onto the focusing lens 11 as the plurality of transmitted rays. Then, the focusing lens 11 is able to manipulate the plurality of transmitted rays into the spot position or the collimating position through the rotational adjustment of the lens carriage 7.

Figure 12:
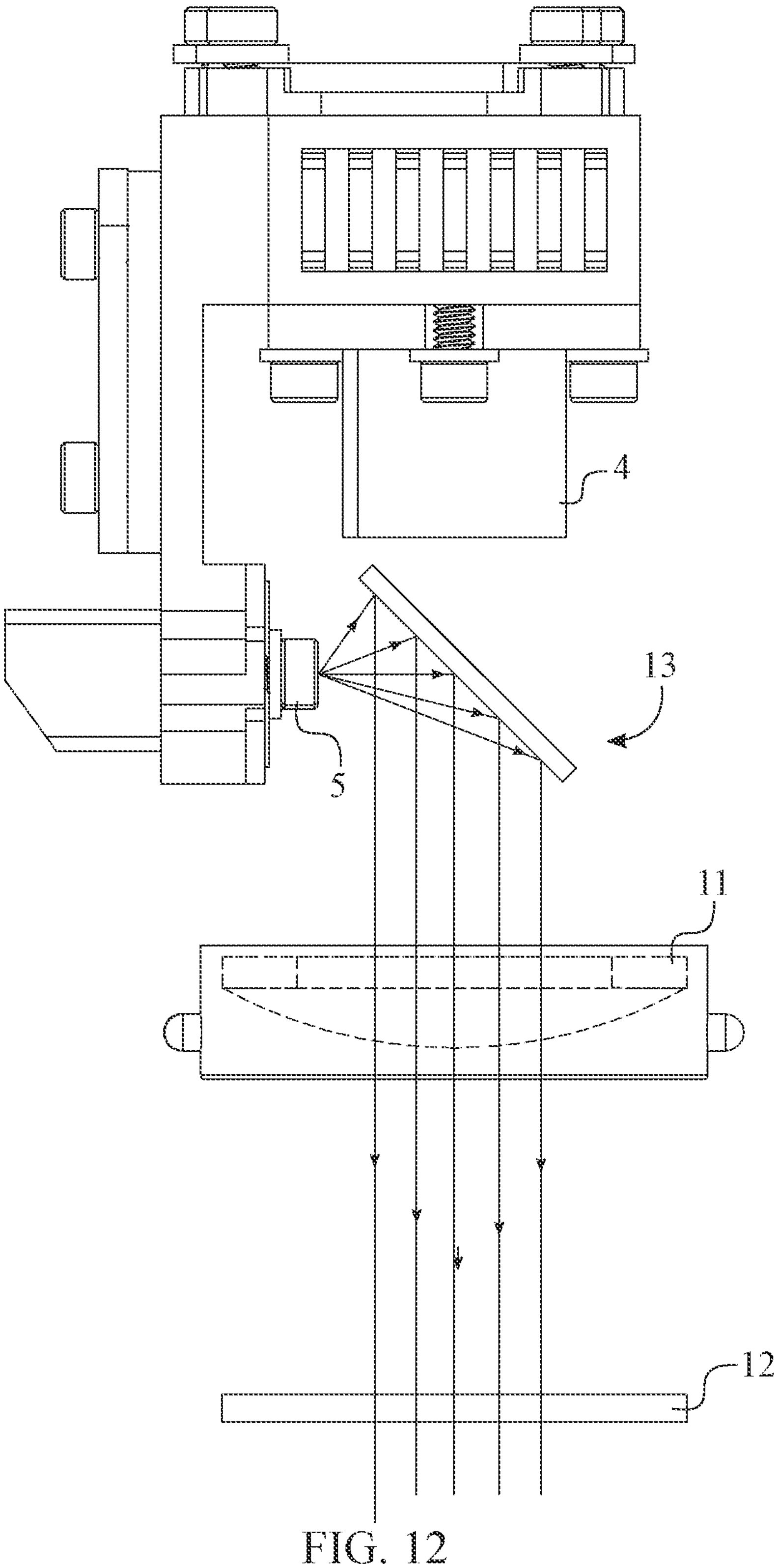
FIG. 12 is a top view of the present invention showing the activation of the second illuminating source and the plurality of reflected rays.
Figure 13:
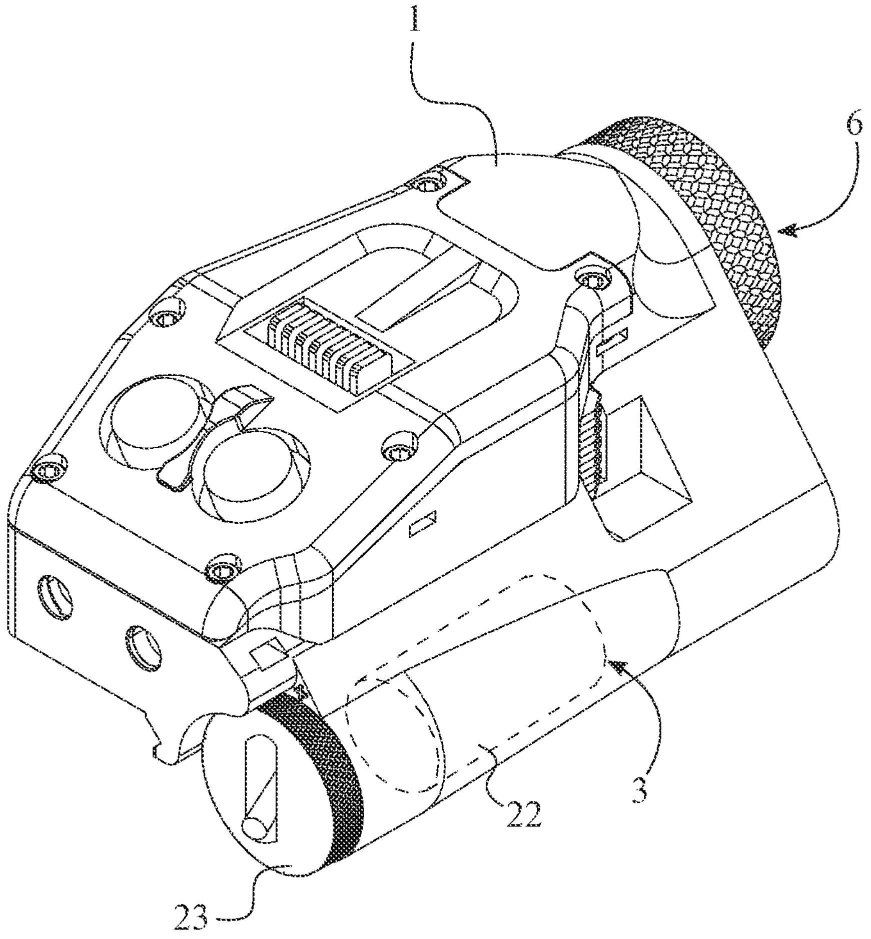
FIG. 13 is a rear view of the present invention showing the internally positioned battery.

As shown in FIG. 10 and FIG. 12, the second illuminating source 5 is internally mounted to the housing 1 and positioned perpendicular to the focusing lens 11. The light reflecting and transmitting filter 13 is angularly positioned to the second illuminating source 5 at a 45 degree angle, wherein the reflective surface 15 of the light reflecting and transmitting filter 13 is angularly oriented toward the second illuminating source 5. As a result, when the second illuminating source 5 emits the plurality of second incident rays towards the reflective surface 15, the plurality of second incident rays reflects about the reflective surface 15 and exits onto the focusing lens 11 as the plurality of reflected rays. Then, the focusing lens 11 is able to manipulate the plurality of reflected rays into the spot position or the collimating position through the rotational adjustment of the lens carriage 7.

Figure 15:
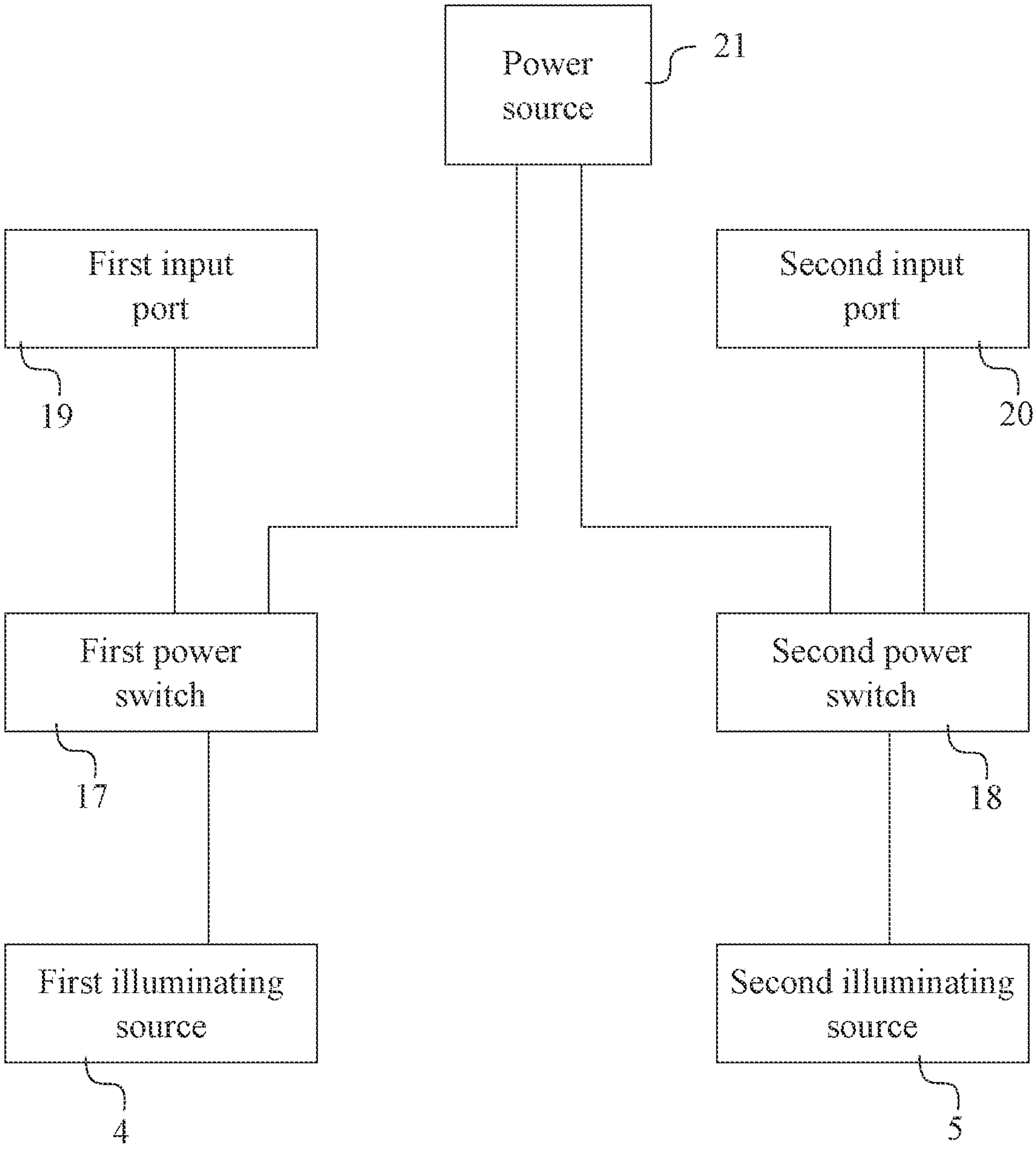
FIG. 15 is a schematic view showing the electrical connection of the present invention.

In reference to FIG. 15, the first power switch 17 is utilized to activate the first illuminating source 4. The second power switch 18 is utilized to activate the second illuminating source 5. upon activation of the first power switch 17 or the second power switch 18, electrical energy of the power source 21 is able to electrically power the first illuminating source 4 or the second illuminating source 5. The first power switch 17 and the second power switch 18 can include but is not limited to, two-stage off/momentary/on mechanical switches, paddle switches, button switches, or any other types of industry standard switches.

The present invention further comprises a first input port 19 and a second input port 20 as shown in FIG. 2 and FIG. 15. More specifically, the first input port 19 is integrated onto the housing 1 and electrically connected to the first power switch 17. The first input port 19 allows a wireless switch, an external switch, or an external controller to be operatively coupled with the first illuminating source 4. The second input port 20 is integrated onto the housing 1 and electrically connected to the second power switch 18. The second input port 20 allows a wireless switch, an external switch, or an external controller to be operatively coupled with the second illuminating source 5. As a result, the present invention provides a secondary option to activate and control the first illuminating source 4 and the second illuminating source 5 other than the first power switch 17 and the second power switch 18.

Figure 16:
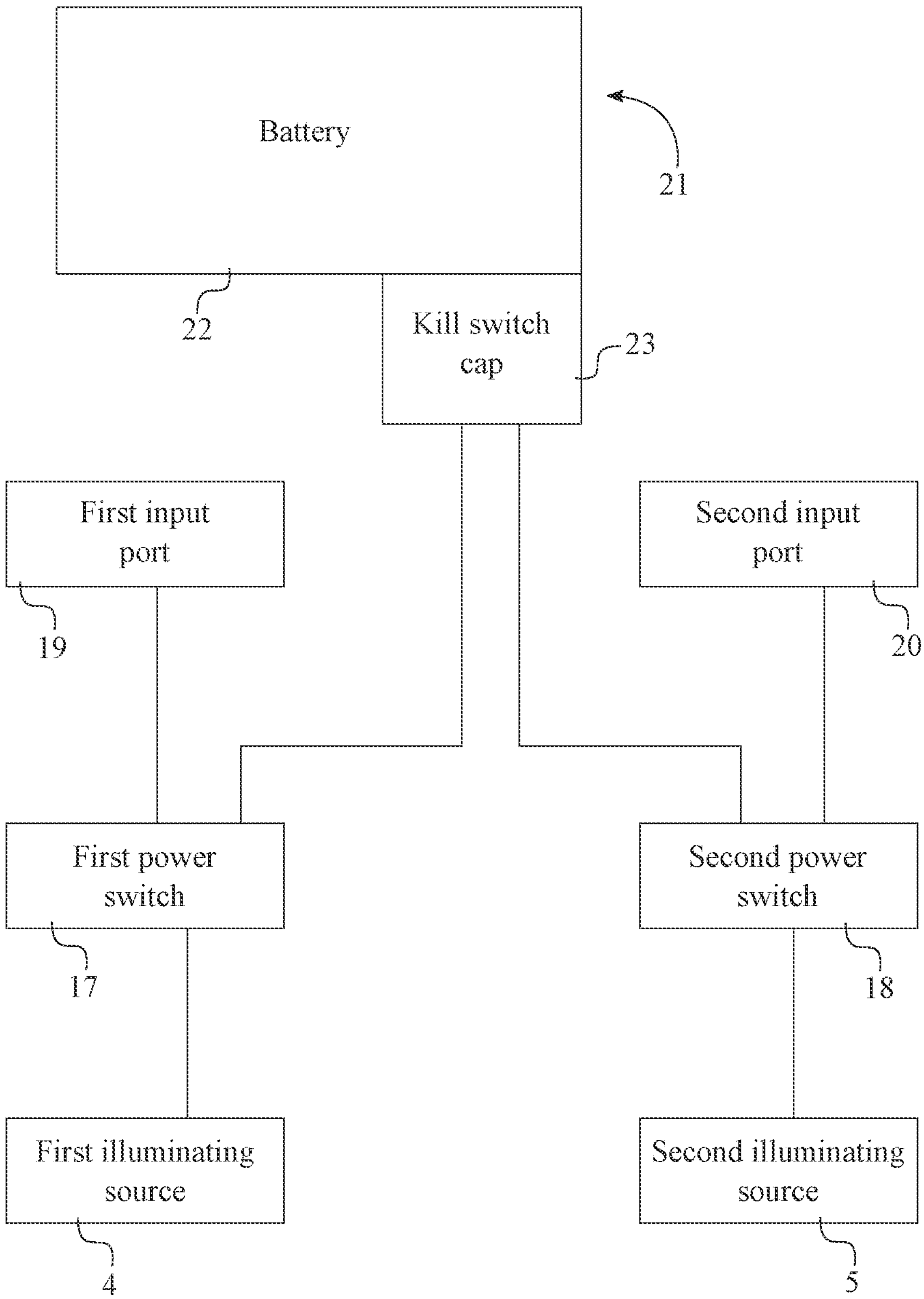
FIG. 16 is a schematic view showing the electrical connection of the present invention in relation to the battery and the kill switch cap.

In reference to FIG. 16, in some embodiment of the present invention, the power source 21 comprises a battery 22 and a kill switch cap 23, wherein the battery 22 functions as an internally mounted power unit. More specifically, the battery 22 is removably positioned within the secondary chamber 3 of the housing 1. The battery 22 is electrically connected to the kill switch cap 23 as the battery 22 is enclosed within the secondary chamber 3 by the kill switch cap 23. Furthermore, the kill switch is electrically connected to the first illuminating source 4 through the first power switch 17 and electrically connected to the second illuminating source 5 through the second power switch 18. The kill switch cap 23 operates between an off-position and an on-position so that the electrical power can be shut-off or supplied to the first power switch 17 and the second power switch 18. For example, when the kill switch cap 23 is configured to the off-position, the first illuminating source 4 and the second illuminating source 5 are not operational as electrical energy is not supplied. When the kill switch cap 23 is configured to the on-position, the first illuminating source 4 and the second illuminating source 5 are operational as electrical energy is supplied.

Figure 17:
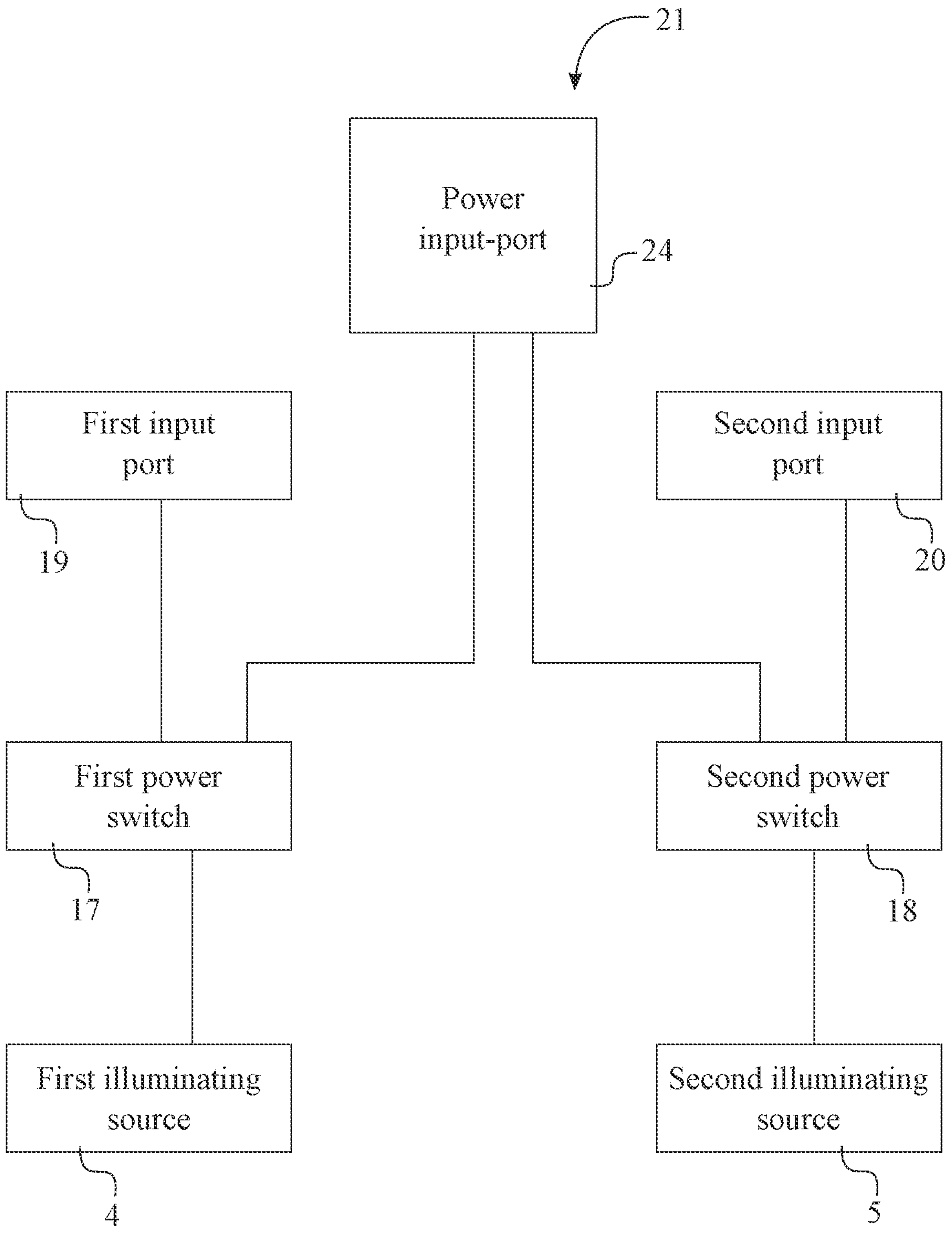
FIG. 17 is a schematic view showing the electrical connection of the present invention in relation to the power input-port.

In reference to FIG. 17, in some embodiment of the present invention, the power source 21 comprises a power input-port 24, wherein the power input-port 24 enables an external power cord to supply electrical energy. More specifically, the power input-port 24 is mounted within the secondary chamber 3 of the housing 1 so that the external power cord can engage with the power input-port 24. As a result, the power input-port 24 is able to electrically connect to the first illuminating source 4 through the first power switch 17 and the second illuminating source 5 through the second power switch 18. It is understood that a protective cap is configured to attach with the opening of the secondary chamber 3 when the external power cord is not utilized to protect the power input-port 24 from dust and debris.

Figure 14:
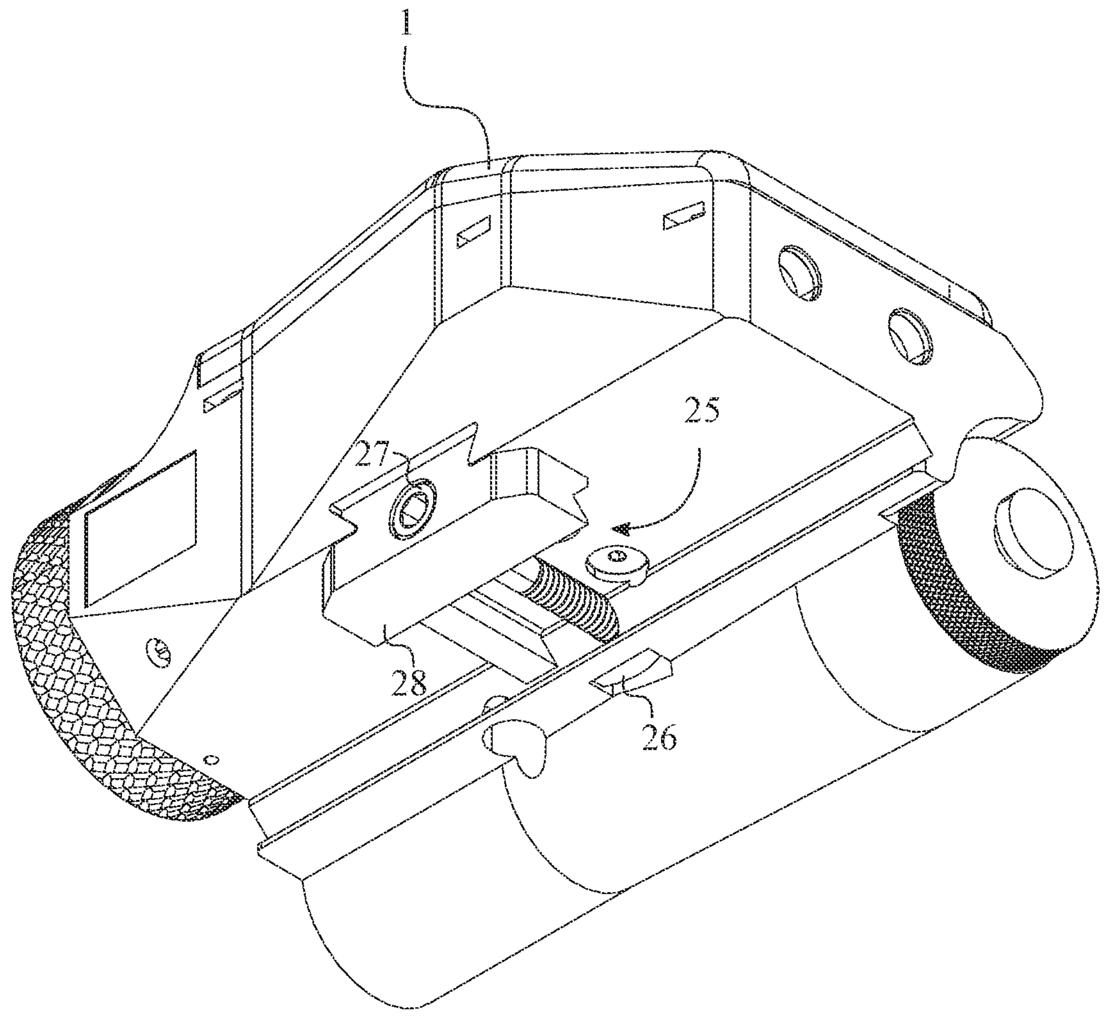
FIG. 14 is a bottom view of the present invention showing the mounting system.

In reference to FIG. 14, the present invention further comprises a mounting system 25 so that the housing 1 can be attached to weapons, vehicles, UAVs, SUAVs, helmets, fences, and other rigid objects. A preferred mounting system 25 comprises a first interlocking fastener 26, a second interlocking fastener 27, and a clamp 28. More specifically, the first interlocking fastener 26 is connected to the housing 1. The second interlocking fastener 27 rotatably traverses through the clamp 28 as the second interlocking fastener 27 is terminally attached to the first interlocking fastener 26. When the second interlocking fastener 27 is rotated, the second interlocking fastener 27 is able to shorten the gap between the housing 1 and the clamp 28. As a result, the housing 1 can preferably be mounted to a weapon via the preferred mounting system 25. It is also understood that the mounting system 25 can be a strap, a ratchet, or any other type of industry standard fastener as long as the housing 1 can be mounted.

Although the invention has been explained in relation to its preferred embodiment, it is to be understood that many other possible modifications and variations can be made without departing from the spirit and scope of the invention as hereinafter claimed.

What is claimed is:

1. A lighting device with multiple light sources comprising:
- a housing;
- a first illuminating source;
- a second illuminating source;
- a lens assembly;
- a light reflecting and transmitting filter;
- a first power switch;
- a second power switch;
- a power source;
- the first illuminating source being mounted within the housing;

the second illuminating source being mounted within the housing;

the first illuminating source and the second illuminating source being perpendicularly positioned of each other;

the lens assembly being operatively coupled to the housing, wherein the lens assembly focuses the first illuminating source and the second illuminating source between a spot position and a collimating position;

the light reflecting and transmitting filter being angularly mounted in between the first illuminating source and the second illuminating source;

the first power switch being mounted onto the housing;

the second power switch being mounted onto the housing;

the power source being electrically connected to the first illuminating source through the first power switch; and the power source being electrically connected to the second illuminating source through the second power switch.

2. The lighting device with multiple light sources as claimed in claim 1 comprising:

the first illuminating source being positioned within a primary chamber of the housing;

the second illuminating source being positioned within the primary chamber of the housing;

the first illuminating source being concentrically positioned to the lens assembly; and the second illuminating source being laterally positioned to the lens assembly.

3. The lighting device with multiple light sources as claimed in claim 1 comprising:

the lens assembly comprising a lens carriage, an annular ring, a focusing lens, and a protective lens;

the lens carriage being concentrically positioned within a primary chamber of the housing;

the annular ring, the focusing lens, and the protective lens being axially positioned within the lens carriage;

the lens carriage being rotatably mounted to the housing;

the annular ring being rotatably engaged within the lens carriage;

the focusing lens being radially connected within the annular ring;

the protective lens being radially connected to the lens carriage;

the focusing lens being positioned adjacent to the light reflecting and transmitting filter; and the protective lens being positioned offset from the focusing lens, opposite of the light reflecting and transmitting filter.

4. The lighting device with multiple light sources as claimed in claim 3 comprising:

the lens carriage comprising a helical cam barrel and a focusing ring;

the helical cam barrel being concentrically positioned to the focusing ring;

the helical cam barrel being adjacently connected to the focusing ring;

the annular ring being rotatably engaged to the helical cam barrel; and the protective lens being radially connected within the focusing ring.

5. The lighting device with multiple light sources as claimed in claim 4 comprising:

the spot position; and the annular ring being positioned adjacent to a distal end of the helical cam barrel.

6. The lighting device with multiple light sources as claimed in claim 4 comprising:

the collimating position; and the annular ring being positioned adjacent to a proximal end of the helical cam barrel.

7. The lighting device with multiple light sources as claimed in claim 1 comprising:

the light reflecting and transmitting filter comprising a glass body, a reflective surface, and a transmission surface;

the glass body being mounted within a primary chamber of the housing; and the reflective surface being oppositely positioned of the transmission surface about the glass body.

8. The lighting device with multiple light sources as claimed in claim 1 comprising:

the lens assembly comprising a focusing lens;

the first illuminating source being internally mounted to the housing;

the first illuminating source being concentrically positioned to the focusing lens;

the light reflecting and transmitting filter being angularly positioned to the first illuminating source at a 45 degree angle; and a transmission surface of the light reflecting and transmitting filter being angularly oriented toward the first illuminating source.

9. The lighting device with multiple light sources as claimed in claim 1 comprising:

the lens assembly comprising a focusing lens;

the second illuminating source being internally mounted to the housing;

the second illuminating source being positioned perpendicular to the focusing lens;

the light reflecting and transmitting filter being angularly positioned to the second illuminating source at a 45 degree angle; and a reflective surface of the light reflecting and transmitting filter being angularly oriented toward the second illuminating source.

10. The lighting device with multiple light sources as claimed in claim 1 comprising:

a first input port;

a second input port;

the first input port being integrated onto the housing;

the second input port being integrated onto the housing;

the first input port being electrically connected to the first power switch; and the second input port being electrically connected to the second power switch.

11. The lighting device with multiple light sources as claimed in claim 1 comprising:

the power source comprising a battery and a kill switch cap;

the battery being removably positioned within a secondary chamber of the housing;

the battery being enclosed by the kill switch cap;

the battery being electrically connected to the kill switch cap;

the kill switch cap being electrically connected to the first illuminating source through the first power switch; and the kill switch cap being electrically connected to the second illuminating source through the second power switch.

12. The lighting device with multiple light sources as claimed in claim 1 comprising:

the power source comprising a power input-port;

the power input-port being mounted within a secondary chamber of the housing;

the power input-port being electrically connected to the first illuminating source through the first power switch; and the power input-port being electrically connected to the second illuminating source through the second power switch.

13. The lighting device with multiple light sources as claimed in claim 1 comprising:

a mounting system;

the mounting system comprising a first interlocking fastener, a second interlocking fastener, and a clamp;

the first interlocking fastener being connected to the housing;

the second interlocking fastener being rotatably traversing through the clamp; and the second interlocking fastener being terminally attached to the first interlocking fastener.

* * * * *